United States Patent
Jones et al.

(10) Patent No.: US 9,505,404 B2
(45) Date of Patent: Nov. 29, 2016

(54) COLLISION AVOIDANCE SYSTEM

(71) Applicant: Jaguar Land Rover Limited, Coventry (GB)

(72) Inventors: Matt Jones, Portland, OR (US); Richard Rowe, Portland, OR (US)

(73) Assignee: Jaguar Land Rover Limited (GB)

( * ) Notice: Subject to any disclaimer, the term of this patent is extended or adjusted under 35 U.S.C. 154(b) by 0 days.

(21) Appl. No.: 14/683,749

(22) Filed: Apr. 10, 2015

(65) Prior Publication Data

US 2016/0297430 A1    Oct. 13, 2016

(51) Int. Cl.
| | |
|---|---|
| *B60W 30/08* | (2012.01) |
| *B62D 15/02* | (2006.01) |
| *B60R 1/00* | (2006.01) |
| *B60R 16/023* | (2006.01) |
| *B60T 7/22* | (2006.01) |
| *B60W 30/09* | (2012.01) |
| *B60W 30/085* | (2012.01) |
| *B60G 99/00* | (2010.01) |

(52) U.S. Cl.
CPC .............. *B60W 30/08* (2013.01); *B60G 99/00* (2013.01); *B60R 1/00* (2013.01); *B60R 16/023* (2013.01); *B60T 7/22* (2013.01); *B60W 30/085* (2013.01); *B60W 30/09* (2013.01); *B62D 15/0265* (2013.01); *B60R 2300/80* (2013.01)

(58) Field of Classification Search
CPC .. B60W 30/08; B60W 30/09; B60W 30/085; B62D 15/0265; B60R 1/00; B60R 16/023; B60R 2300/80; B60T 7/22; B60G 99/00
See application file for complete search history.

(56) References Cited

U.S. PATENT DOCUMENTS

| | | | | |
|---|---|---|---|---|
| 6,477,466 | B1* | 11/2002 | Kocherscheidt | ... B60G 17/0164 280/5.5 |
| 6,944,544 | B1* | 9/2005 | Prakah-Asante | ... B60R 21/0134 342/42 |
| 7,761,205 | B2* | 7/2010 | Onuma | ............... B60G 17/015 280/6.15 |
| 9,174,508 | B2* | 11/2015 | Anderson | ............ B60G 17/016 |
| 2010/0253597 | A1* | 10/2010 | Seder | ........................ B60R 1/00 345/7 |
| 2013/0222595 | A1* | 8/2013 | Gebauer | ................ H04N 5/217 348/148 |
| 2014/0195113 | A1* | 7/2014 | Lu | ...................... B60G 17/0165 701/37 |
| 2014/0343750 | A1* | 11/2014 | Minemura | ............ B60W 50/04 701/1 |
| 2015/0009285 | A1* | 1/2015 | Morishima | ............... B60R 1/00 348/36 |
| 2015/0202939 | A1* | 7/2015 | Stettner | ............... B60R 21/0134 701/37 |
| 2015/0224845 | A1* | 8/2015 | Anderson | ............ B60G 17/019 701/37 |

* cited by examiner

*Primary Examiner* — Rodney Butler
*Assistant Examiner* — Frederick Brushaber
(74) *Attorney, Agent, or Firm* — Myers Bigel, P.A.

(57) ABSTRACT

The present invention relates to a collision system in a vehicle that uses a three dimensional imaging device to map a three dimensional object external to the vehicle. A positioning module will superimpose the position of the body of the vehicle onto the mapped object in dependence of the potential impact location. The positioning module will communicate the impact location to a collision avoidance aid such as an audio or visual warning.

17 Claims, 6 Drawing Sheets

COLLISION AVOIDANCE SYSTEM

FIELD

The present disclosure relates to a collision avoidance system for a vehicle. Aspects of the invention relate particularly, but not exclusively, to a collision avoidance system for a vehicle, a vehicle, a method of detecting a collision risk and a method of avoiding a collision.

BACKGROUND

A vehicle, such as a car or the like, includes a vehicle body supported, and driven by a plurality of wheels. The car can move in a forward direction and a rearward direction. When moving, the environment surrounding the vehicle will often include objects, with which objects the vehicle could collide. In order to obviate such collisions, modern cars are often fitted with a parking sensor.

A typical parking sensor includes a proximity sensor such as an ultrasonic transducer. The ultrasonic transducer works by emitting an ultrasonic wave and monitoring for return waves reflected off objects located within the environment surrounding the vehicle. Upon detecting any objects, the driver can be alerted to their presence and even provided with their approximate location. This is often achieved by a dashboard mounted display device.

This type of proximity sensor is inherently inaccurate since they will only measure the distance to an object. As a result, some objects may be clearable by the vertical clearance of the body of the vehicle off the ground, such as a rock or a high curb, but will still be detected and presented to the driver as a potential impact.

It is an object of the present invention to address disadvantages associated with the prior art.

SUMMARY

Aspects and embodiments of the invention provide a collision avoidance system for a vehicle, a vehicle, a method of sensing a collision risk and a method of avoiding a collision.

According to an aspect of the present invention there is provided a collision avoidance system for a vehicle, comprising; a three-dimensional imaging device for mapping a three dimensional object located within a surrounding environment of a vehicle; a positioning module arranged to superimpose a potential position of a body of the vehicle on to the object; an impact detection module arranged to distinguish between an impact location on the object and a clearance location on the object based on the potential position of the body of the vehicle on the object; and a communication module for communicating the impact location to a collision avoidance aid.

Distinguishing between an impact location and a clearance location is made possible by superimposing the potential position of the body of the vehicle on to the object. In doing so, those instances where an object is clearable by the vehicle body will not be flagged as requiring action to obviate a collision.

In an embodiment of the present invention, the three-dimensional imaging device may be located at a front end of the vehicle for observing an environment in front of the vehicle. In this way, during forward driving, any objects which pose a collision risk can be addressed.

In an embodiment of the present invention, the three-dimensional imaging device may be located at a rear end of the vehicle for observing an environment behind the vehicle. In this way, during reversing, any objects which pose a collision risk can be addressed.

In an embodiment of the present invention, the positioning module may comprise a detector for detecting a vehicle state and a geometric model of the vehicle, the positioning module may be arranged to determine the potential position of the body of the vehicle based on the vehicle state and the geometric model of the vehicle. Using the combination of a vehicle state and a geometric model allows for the potential position of the body of the vehicle to be altered dynamically and in real time since the vehicle state may change, in-use.

In an embodiment of the present invention, the vehicle state may be selected from a list including suspension setting, vehicle velocity, vehicle orientation and steering wheel angle. The suspension setting can be used to determine a vertical clearance height of an underside of the body of the vehicle which is important when objects are at ground level, such as large rocks. The vehicle velocity can be used to determine a potential severity of an impact since at lower speeds, impacts with soft clay or mud would not cause damage to the vehicle compared to impacting the same surface at higher vehicle velocities. In addition, when combined with orientation, the vehicle velocity may be important for instance in a case where a vehicle is descending a steep hill quickly, a ground level object at the foot of the hill, such as a rock, may be more likely to collide with an underside of the body of the vehicle body than descending the same gradient at a much lower speed. The steering wheel angle can also be used to determine a likely trajectory of a vehicle during a turn to determine if the body of the vehicle is likely to impact on the object or whether a turn radius is sufficient to avoid collision between the object and the body of the vehicle.

In an embodiment of the present invention, the collision avoidance aid may comprise a display arranged to display the impact location superimposed on to the object. In this way, the collision avoidance device, namely the display, allows for manual collision avoidance since the driver can choose to take note of the collision risk or ignore it. This is particularly advantageous where the impact location is shown on an object which is relatively soft such as vegetation or soft earth, such as clay or a mound of sand, which would not necessarily warrant a detour from the current vehicle trajectory.

In an embodiment of the present invention, the collision avoidance system may comprise the display, which display may be situated within a cabin of the vehicle for use by a driver of the vehicle.

In an alternative embodiment of the present invention, the display may be a remote user interface device communicable with the communication module over a network. In this way, an external spotter can make an improved judgment for providing navigation instructions to the driver of the vehicle.

Additionally or alternatively to the display, the collision avoidance aid may comprise an audio device. The audio device can provide an alert or even automated commentary to a navigator of the vehicle.

In an embodiment of the present invention, the collision avoidance system may comprise the collision avoidance aid, which collision avoidance aid may comprise a vehicle adjustment system for adjusting the vehicle automatically to avoid a collision between the body of the vehicle and the object. Adjusting the configuration of the vehicle automatically obviates the need for driver intervention, which can be important at times of high driver work load who may miss the impact location, especially if such an impact location only appears late or is relatively small in size.

In an embodiment of the present invention, the vehicle adjustment system may comprise a suspension system for adjusting a ride height of the vehicle. A ground level rock for instance may be clearable by raising the ride height of the body of the vehicle. This is particularly important for such cases of ground level objects since a driver may unnecessarily divert laterally around an object when all that would be required is a ride height adjustment.

In an embodiment of the present invention, the vehicle adjustment system may comprise a drive or braking system for adjusting a velocity of the vehicle. For instance, retarding the vehicle, using the braking system or even the drive system for engine braking, can help in avoiding a collision or reducing a severity of an impact.

In an embodiment of the present invention, the vehicle adjustment system may comprise a steering system for controlling a turning path of the vehicle. Modification of the steering angle of the vehicle may help avoid collisions with objects which pose a collision risk to a side of the body of the vehicle, for instance, a wall.

According to a further aspect of the present invention, there is provided a vehicle comprising the aforementioned collision avoidance system.

According to a further aspect of the present invention, there is provided a method of sensing a collision risk comprising;
  a. mapping a three dimensional object located within a surrounding environment of a vehicle;
  b. superimposing a potential position of a body of the vehicle on to the object;
  c. distinguishing between an impact location on the object and a clearance location on the object based on the potential position of the body of the vehicle on the object; and
  d. communicating the impact location to a collision avoidance aid.

According to a further aspect of the present invention, there is provided a method of avoiding a collision comprising;
  a. sensing a collision risk using the aforementioned method; and
  b. adjusting a configuration of the vehicle automatically to avoid the body of the vehicle colliding with the object.

According to an alternative aspect of the present invention, there is also provided a method of avoiding a collision comprising;
  a. sensing a collision risk using the aforementioned method; and
  b. displaying the impact location to a navigator of the vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
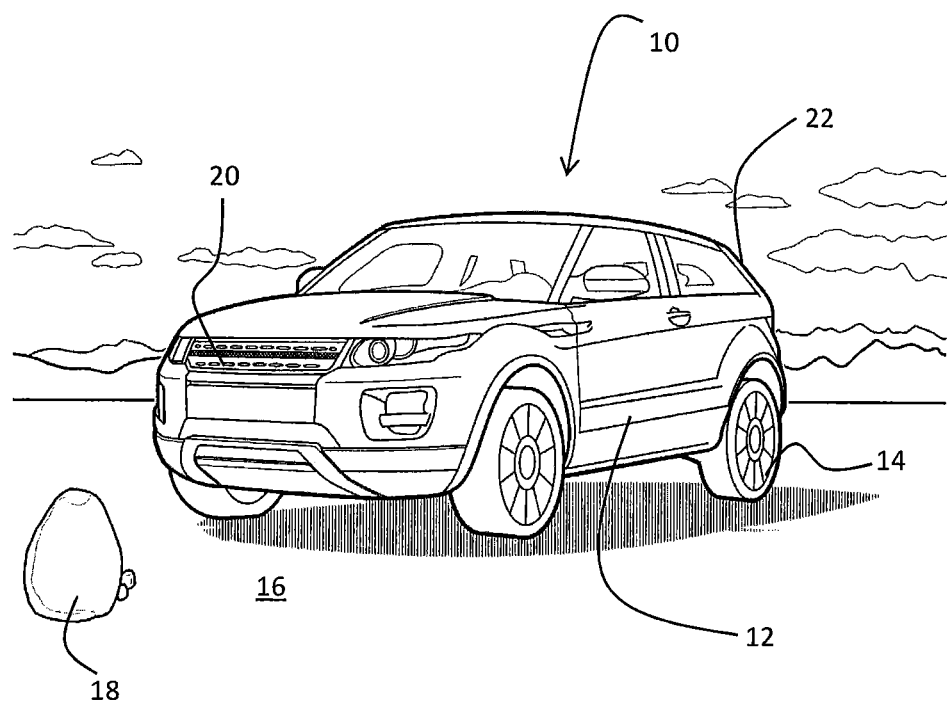
FIG. 1 shows a perspective view of a vehicle approaching an object within an exterior environment of the vehicle.

With reference to FIG. 1, a vehicle 10, in this case an off-road vehicle, includes a body 12 supported by four wheels 14. The wheels 14 raise the body 12 from the ground 16 such that an underside of the body 12 is vertically displaced by a ride height above the ground 16.

When driving, especially during off-road driving, the vehicle 10 may encounter various objects 18. The object 18 shown in FIG. 1 is a rock though other objects may exist such as mounds of earth, sand, waste materials, and vegetation, such as shrubs and thickets.

Figure 2:
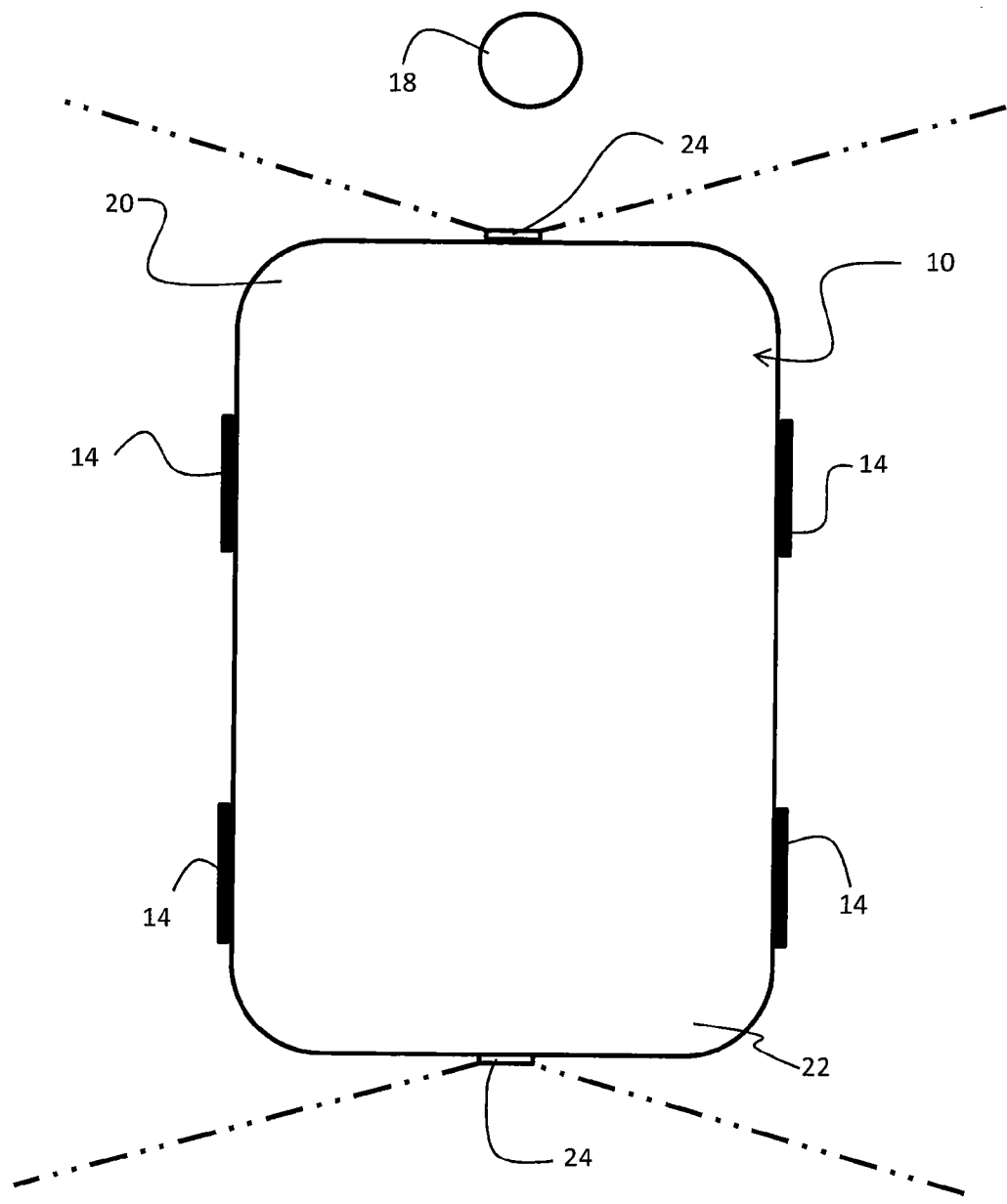
FIG. 2 shows a schematic view from above of the vehicle of FIG. 1 having a collision avoidance system according to an embodiment of the present invention.

With reference to FIG. 2, the vehicle 10 has a front end 20 and a rear end 22. The vehicle 10 also includes a three dimensional imaging device 24 at both ends 20, 22. The three dimensional imaging device 24 is in the form of a stereoscopic camera. The stereoscopic camera is not described in great detail here since such cameras are known in a field of photography. However, in summary, a stereoscopic camera includes two lenses displaced from one another by a separation distance. In practice, the lenses are combined in a single unit forming the stereoscopic camera. In-use, the camera can obtain near field depth perception by comparing like images observed from each lens, which images will be different due to the difference in locality of each lens. As shown in FIG. 2, the camera is a wide view field camera. The camera at the front end 20 can thus observe a front exterior environment and the camera at the rear end 22 can observe a rear exterior environment. In this way, the stereoscopic camera is able to map a three dimensional image of the front and rear environments of the vehicle 10. A suitable camera may have a 640×480 pixels resolution and a shutter speed of 12 frames per second, or greater.

Figure 3:
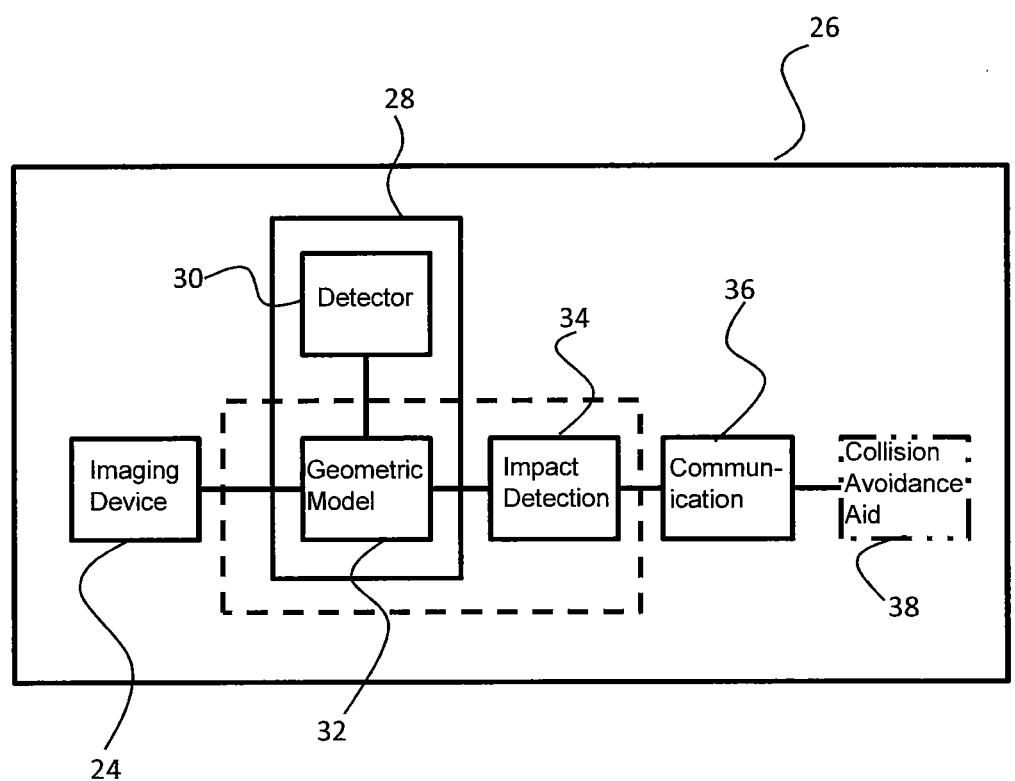
FIG. 3 shows a high level block diagram containing the collision avoidance system of an embodiment of the present invention.

With reference to FIG. 3, the vehicle (not shown) includes a collision avoidance system 26, which is shown as a high level block diagram contained within a solid box. The collision avoidance system 26 includes the three dimensional imaging device 24. The three dimensional imaging device 24 is linked to a positioning module 28. The positioning module 28 is described in more detail below but includes a detector 30 for detecting a vehicle state and a geometric model 32 of the vehicle. The positioning module 28 is linked to an impact detection module 34 which outputs to a communication module 36. Finally, the communication module 36 is linked to a collision avoidance aid 38. The collision avoidance aid 38 is shown by a double-dotted-dashed line since in some embodiments the collision avoidance aid is part of the vehicle 10 whereas in other embodiments, the collision avoidance aid 38 is provided as an external device, as will be described in further detail below.

The geometric model 32 and the impact detection module 34 are provided as electronic data stored on a memory component of a computer of the vehicle. Accordingly, the geometric model 32 and the impact detection module 34 are shown within a broken line in FIG. 3. The memory component may take any suitable form such as a non-volatile memory unit for storing electronic data. The electronic data is executed by a processor (not shown) which receives inputs from the camera 24 and outputs data to the communication module 36.

The geometric model 32 includes dimension data of the vehicle, in particular, static data relating to the size and shape of the body of the vehicle (FIG. 1) including width, roof height, and length as well as bonnet, cabin and boot dimensions. Additional static data is provided as part of the geometric model 32 including wheel diameter and tire size. The geometric model 32 also includes dynamic data such velocity, suspension, vehicle orientation and terrain response functions which link to the static data to obtain geometric boundary conditions for the vehicle.

The detector 30 may take several forms and more than one detector may be provided. The detector 30 measures various vehicle states, which states are used as inputs to the geometric model 32 for obtaining the real time geometric boundary conditions of the vehicle. The vehicle states of particular interest include a suspension setting, a velocity of the vehicle, an orientation of the vehicle, and an angle of the steering wheel for determining a turn radius of the vehicle. The boundary conditions are simulated to obtain a potential position of the body of the vehicle at a future point in time if the vehicle were to move forwards or backwards.

The positioning module 28 receives the camera data which processes the data to obtain a three dimensional representation of the exterior environment of the vehicle 10, together with any objects 18 contained within the exterior environment (FIG. 1). The locations of any objects 18 (FIG. 1) detected by the camera are compared to the geometric boundary conditions to determine if any parts of the object 18 are contained within the geometric boundary conditions. The potential position of the body of the vehicle is superimposed onto the exterior environment of the vehicle. This is best described with reference to FIG. 4.

Figure 4:
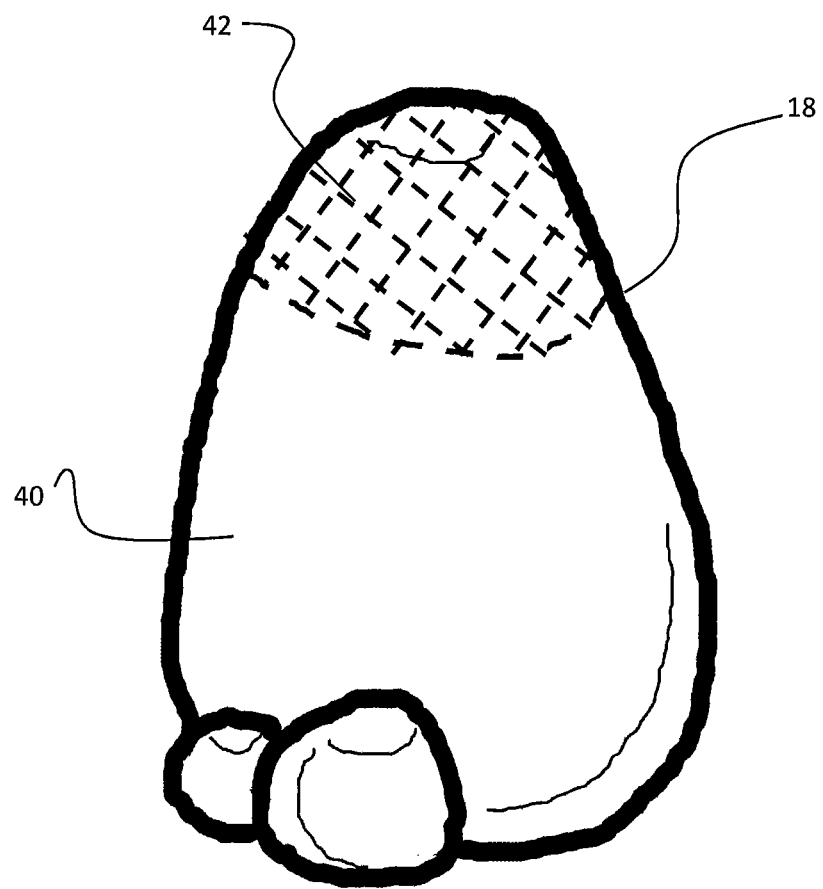
FIG. 4 shows a view of the object shown in FIG. 1 as mapped by the system.

FIG. 4 shows a view of the mapped object 18 (rock) from the viewpoint of the camera on the vehicle. The stereoscopic camera detects the location and shape of the object 18 and the positioning module creates a map thereof, referred to herein as the mapped object. The mapped object can then be used by the positioning module 28 to detect a potential collision between the object 18 and the vehicle. The potential position of the body of the vehicle is superimposed on to the mapped object by the positioning module. The lower part of the mapped object, which is below a ride height of the body of the vehicle, is shown as a clearance location 40 and intentionally left blank. The upper part of the mapped object is above the ride height of the body of the vehicle and is shown as a shaded area, or in this case a cross-hashed region, since the upper part of the mapped object is an impact location 42, which would collide with the underside of the body of the vehicle if forward motion is continued. It will be appreciated that the mapping and superimposition may be carried out mathematically in the positioning module 28 and the output to the driver could be a warning of a potential collision. Alternatively the system may map the entire environment surrounding the vehicle (within the field of view of the camera) and output a graphical representation thereof to the driver together with warning indicia of potential collision points within that mapped environment.

Figure 5:
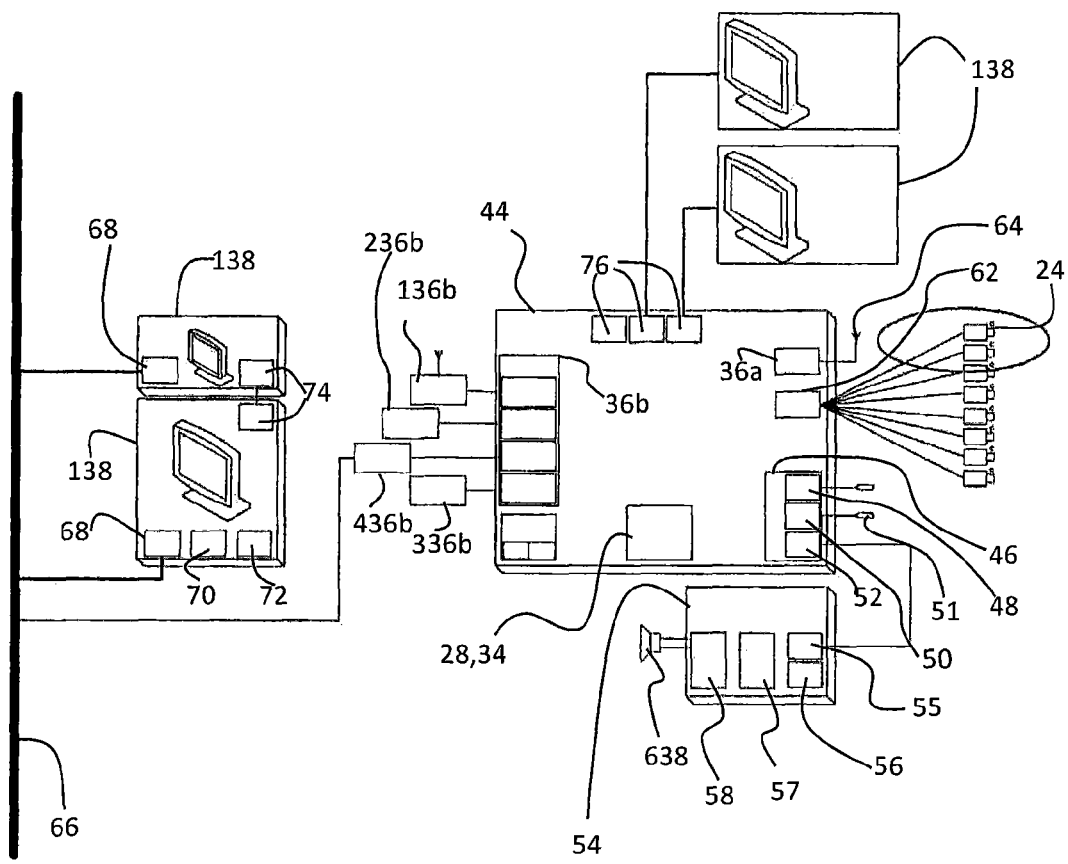
FIG. 5 shows a detailed block diagram of the collision avoidance system of an embodiment of the present invention using a display as a collision avoidance aid.

FIG. 5 shows an embodiment of the collision avoidance system in the form of a detailed block diagram showing various components of the collision avoidance system including 26 containing the collision avoidance aid in the form of a display 138.

In more specific terms, FIG. 5 shows an infotainment controller 44 having an algorithm stored thereon in the form of electronic data, which data includes the positioning module 28 and the impact detection module 34. The controller 44 also includes an audio function 46 containing two microphone ports; one stereo IN port 48 and one stereo OUT port 50 each linked to a microphone 51. The audio function 46 also includes an audio output port 52 for outputting audio signals to an audio amplifier 54.

The audio amplifier 54 includes an input terminal 55, formatted in accordance with 'Sony®/Philipps® Data Interface Format' (SPDIF) for receiving the audio signals from the infotainment controller. The audio amplifier 54 also includes a Media Oriented Systems Transport (MOST) bus 57 for communicating the electronic signals to the various functions of the audio amplifier 54. A Data Signal Processing (DSP) module 56 is included as part of the audio amplifier 54 to process the audio signals received from the infotainment controller 44. An amplifier function 58 is provided for amplifying the processed audio signals prior to operation of a speaker 638, which speaker 638 is linked to the audio amplifier 54. The speaker 638 is situated within a cabin of the vehicle (FIG. 1).

The infotainment controller 44 also includes a camera input terminal 62, which in this embodiment includes eight jacks for receipt of eight cables each being linked to a camera 24. There are shown six exterior cameras and two interior cameras. This number may change as highlighted above whereby there are only two exterior cameras as described above. However, it should be noted that the cameras shown in FIG. 5 may be used for various purposes and in this embodiment, only two of the exterior cameras are stereoscopic cameras 24, whereas the other cameras may serve other purposes.

The infotainment controller 44 also includes two types of communications module 36. One type of communications module 36a communicates via an aerial 64 over a WIFI, BT, 3G, or other such communications network with a remote electronic system. The other type of communications module 36b is a USB port block, in this case four USB ports, for communicating with systems within the vehicle. However, it will be appreciated that such on-board systems may themselves include communication functions, such as a USB GPS antenna 136b, a USB 4G Dongle 236b, or another standard communications means, such as a USB RS-232 connector 336b.

In the case of the present embodiment, the USB port of interest is connected to a CAN adapter 436b for linking the infotainment controller 44 with a Controlled Area Network (CAN) bus 66 for communication with other on-board systems. In this embodiment, the CAN bus 66 is linked to the collision avoidance aid in the form of a display 138. The display 138 is a 'heads-up-display' (HUD) due to its locality being at or above the eye line of a driver within the cabin. The display 138 comprises a cluster Thin Film Transistor (TFT) screen. The display 138 is linked to the CAN bus 66 via a CAN input port 68. The display 138 may include a processor 70, or CPU, and an Ethernet function 72, and an input/output port 74 between the HUD and the TFT screen. As an alternative to the CAN bus linked display 138, the display 138 may be connected to the infotainment controller 44 via direct video ports 76. It will be appreciated that the arrangement described herein is illustrative only and any communications network and any type of appropriate visual display may be used in place of the CAN network and/or the TFT display.

In-use, the vehicle 10 of FIG. 1 approaches the object 18 within its front environment. The stereoscopic camera 24 (FIG. 2) detects the object 18 and creates an electronic map thereof and the positioning module (FIG. 3) superimposes a potential position of the body of the vehicle on to the mapped object 18 as shown in FIG. 4. The impact detection module 34 (FIG. 3) distinguished between impact locations 42 and clearance locations 40. The CAN adapter 436b communicates the impact location 42, the object 18 and the clearance location 40 (FIG. 4) to the display 138 via the CAN bus 66. The display 138 displays an image of the front exterior environment of the vehicle including the object 18 and the superimposed image of the impact location 42 as shown in FIG. 4. A driver can use the cross hashed (or coloured) impact location 42 information to determine if the object poses a risk of damaging an underside of the body of the vehicle. Since the environment is shown as an image, the driver will be able to determine the nature of the object 18 to determine if striking the object at all will cause damage and thus the object needs to be avoided or whether a slower approach might suffice in protecting the vehicle, for instance if the object 18 is a mount of sand of clay or even vegetation. In this case, the object 18 is a rock and so the driver will likely decide to turn the vehicle laterally to steer around the object 18 to avoid a collision altogether.

In an alternative embodiment, the display 138 is not part of the vehicle but is a remote display such as a remote electronic device in the form of a tablet, a smart phone or a laptop computer, for instance. The infotainment controller 44 can communicate with the display 138 using the USB 4G dongle 236b or even using the communications module 36 linked to the WIFUBT aerial 36a.

In a further embodiment, the collision avoidance system 26 includes the same components as hereinbefore described save the collision avoidance aid 38 is not a display 138 but rather the collision avoidance aid is an audio device, such as the speaker 638. The speaker 638 may be incorporated in addition to the display 138 and provides an audio warning, either by an alert sound or by computerized commentary to describe the collision risk to the navigator.

Figure 6:
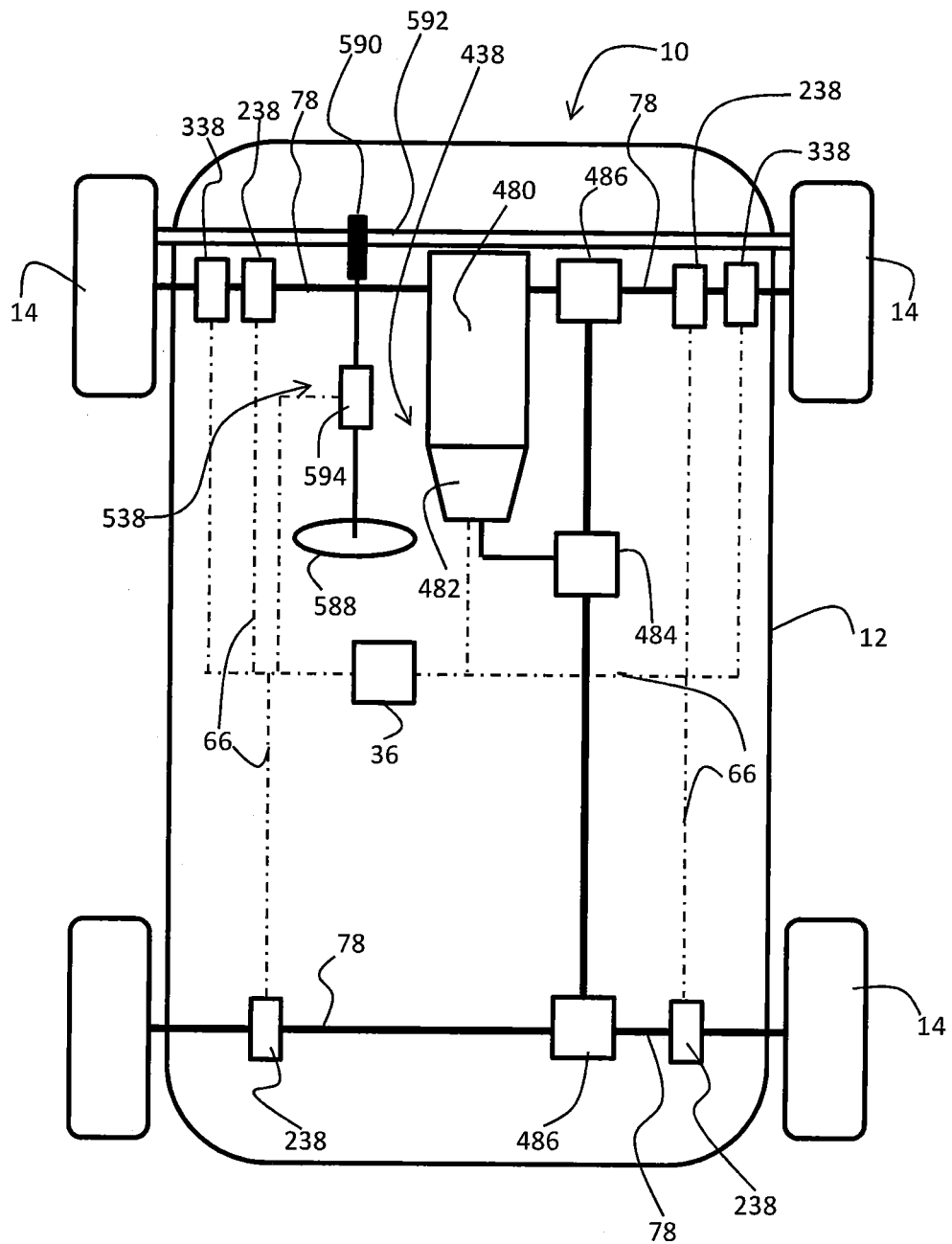
FIG. 6 shows a similar view to FIG. 2 of the vehicle including a plurality of alternative collision avoidance aids to the display from FIG. 5.

In further alternative embodiments, the collision avoidance system 'up-stream' of the collision avoidance aid 38 is the same as that described above. However, the collision avoidance aid 38, itself, may be replaced by other vehicle systems which can actively and automatically control the vehicle in an attempt to avoid a collision with the object 18. FIG. 6 shows various alternative collision avoidance aids 38 which can be used to automatically control the vehicle without driver intervention.

With reference to FIG. 6, one of the alternative embodiments includes a collision avoidance aid in the form of a suspension system 238. The suspension system itself is known and includes resilient members in the form of leaf springs, each leaf spring supporting a side shaft 78. The leaf springs are arranged to deflect when the wheels 14 suddenly change height during driving so as to maintain an approximately horizontal position of the body 12. The suspension system 238 has a changeable height to alter a ride height of the body 12. The suspension system is connected to the CAN bus 66 via the communications module 36, which communications module 36 is part of a central controller as opposed to the infotainment controller 44 (FIG. 5). In response to the impact detection module 34 detecting an impact location, the suspension system 238 is controlled by the controller to alter automatically the ride height of the body 12 by changing the setting of the leaf springs. In this way, a ground level object 18 such as a rock (FIG. 1) can be avoided in some instances by increasing the ride height of the vehicle 10.

Still with reference to FIG. 6, a further alternative embodiment includes a collision avoidance aid in the form of a braking system 338. The braking system 338 in this embodiment is a front wheel disc brake system, though this concept is equally applicable to other types of braking system. The disc braking system 338 includes opposing brake pads mounted within a caliper and situated over a brake disc (not shown), which brake disc is connected to each front side shaft 78. The disc braking system 338 is connected to the communications module 36 by the CAN bus 66 for receiving control signals therefrom. In-use, the impact detection module 34 (FIG. 3) can determine whether the impact location warrants retardation of the vehicle 10 to avoid a collision with the object and configure the braking system to apply varying degrees of pressure to the brake disc accordingly.

Still with reference to FIG. 6, a further alternative embodiment includes a collision avoidance aid in the form of a drive system 438. The drive system 438 includes an engine 480, a gear box 482, a central drive unit 484, and front and rear final drive units 486. In the event of an object 18 being detected, it is unlikely that an increase in velocity will be desirable though it may be beneficial, for instance on a down-hill descent, to decrease the velocity to avoid a collision. In this way, a down-shift in gear may be beneficial to invoke engine braking. To this end, the communications module 36 may send a signal to the gear box 482 to change down in gear accordingly.

Still with reference to FIG. 6, a further embodiment includes a collision avoidance aid in the form of a steering system 538. In this case the steering system 538 is an electronic power assisted steering system (EPAS). The EPAS 538 includes a steering wheel 588 linked indirectly to a pinion 590 and a rack of a track rod 592 via a steering motor 594. In-use, a steering input may be reconfigured by the motor 594 to apply differing degrees of rotation of the pinion 590 to displace laterally the track rod 592, and thus the front wheels 14, by a desired amount. The motor 594 is connected to the communications module 36 again by the CAN bus 66. In this way, the collision avoidance system can configure the steering behaviour of the vehicle 10 to avoid collisions in the event of a relatively approaching object 18. This embodiment is particularly useful for objects which impinge on the body 12 from a side angle, such as a wall or a shrub or the like, which can be avoided easily without deviating greatly from the original path of the vehicle.

It should be noted that although the aforementioned automatic collision avoidance aids are beneficial to preventing damage to the vehicle, such measures are particularly suited to minor adjustments, even to the extent of being negligible to occupants of the vehicle since to prevent the collision avoidance system being counter-productive.

Aspects and embodiments of the invention will be further understood with reference to the following non-limiting clauses:

1. A collision avoidance system for a vehicle, comprising; a three-dimensional imaging device for mapping a three dimensional object located within a surrounding environment of a vehicle; a positioning module arranged to superimpose a potential position of a body of the vehicle on to the mapped object; an impact detection module arranged to distinguish between an impact location on the mapped object and a clearance location on the mapped object based on the potential position of the body of the vehicle on the mapped object; and a communication module for communicating the impact location to a collision avoidance aid.

2. The collision avoidance system of Claim 1 wherein the three-dimensional imaging device is located at a front end of the vehicle for observing an environment in front of the vehicle.

3. The collision avoidance system of Claim 1 wherein the three-dimensional imaging device is located at a rear end of the vehicle for observing an environment behind the vehicle.

4. The collision avoidance system of any preceding Claim wherein the positioning module comprises a detector for detecting a vehicle state and a geometric model of the vehicle, the positioning module arranged to determine the potential position of the body of the vehicle based on the vehicle state and the geometric model of the vehicle.

5. The collision avoidance system of Claim 4 wherein the vehicle state is selected from a list including suspension setting, vehicle velocity, and steering wheel angle.

6. The collision avoidance system of any preceding claim wherein the collision avoidance aid comprises a display arranged to display the impact location superimposed on to the mapped object within the exterior environment of the vehicle.

7. The collision avoidance system of Claim 6 comprising the display, said display situated within a cabin of the vehicle for use by a driver of the vehicle.

8. The collision avoidance system of Claim 6 wherein the display comprises a remote user interface device communicable with the communication module over a network.

9. The collision avoidance system of any of any preceding CLAIM wherein the collision avoidance aid comprises an audio device.

10. The collision avoidance system of any of Claims 1 to 5 comprising the collision avoidance aid, said collision avoidance aid comprising a vehicle adjustment system for adjusting the vehicle automatically to avoid a collision between the body of the vehicle and the mapped object.

11. The collision avoidance system of Claim 10 wherein the vehicle adjustment system comprises a suspension system for adjusting a ride height of the vehicle.

12. The collision avoidance system of Claim 10 or Claim 11 wherein the vehicle adjustment system comprises a drive or braking system for adjusting a velocity of the vehicle.

13. The collision avoidance system of any of Claims 10 to 12 wherein the vehicle adjustment system comprises a steering system for controlling a turning path of the vehicle.

14. A vehicle comprising the collision avoidance system of any preceding claim.

15. A method of sensing a collision risk comprising;
mapping a three dimensional object located within a surrounding environment of a vehicle;
superimposing a potential position of a body of the vehicle on to the mapped object;
distinguishing between an impact location on the mapped object and a clearance location on the mapped object based on the potential position of the body of the vehicle on the mapped object; and
communicating the impact location to a collision avoidance aid.

16. A method of avoiding a collision comprising;
sensing a collision risk using the method of claim 15; and
adjusting a configuration of the vehicle automatically to avoid the body of the vehicle contacting the mapped object.

17. A method of avoiding a collision comprising;
sensing a collision risk using the method of claim 15; and
displaying the impact location to a navigator of the vehicle.

18. A collision avoidance system, a vehicle, a method of sensing a collision risk, and a method of avoiding a collision as described substantially herein with reference to the accompanying Figures.

What is claimed is:

1. A collision avoidance system for a vehicle, comprising:
a three-dimensional-imaging-device arranged to map a three dimensional object located within a surrounding environment of a vehicle;
a positioning module arranged to superimpose a potential position of a body of the vehicle on to the mapped object;
an impact detection module arranged to distinguish between an impact location on the mapped object above a ride height of the body of the vehicle and a clearance location on the mapped object below a ride height of the body of the vehicle based on the potential position of the body of the vehicle on the mapped object; and
a communication module for communicating the impact location to a collision avoidance aid.

2. The collision avoidance system of claim 1, wherein the three-dimensional-imaging-device is located at a front end of the vehicle for observing an environment in front of the vehicle.

3. The collision avoidance system of claim 1, wherein the three-dimensional-imaging-device is located at a rear end of the vehicle for observing an environment behind the vehicle.

4. The collision avoidance system of claim 1, wherein the positioning module comprises a detector for detecting a vehicle state and a geometric model of the vehicle, the positioning module arranged to determine the potential position of the body of the vehicle based on the vehicle state and the geometric model of the vehicle.

5. The collision avoidance system of claim 4, wherein the vehicle state is selected from a list including suspension setting, vehicle velocity, and steering wheel angle.

6. The collision avoidance system of claim 1, wherein the collision avoidance aid comprises a display arranged to display the impact location superimposed on to the mapped object within the surrounding environment of the vehicle.

7. The collision avoidance system of claim 6, wherein the display is situated within a cabin of the vehicle for use by a driver of the vehicle.

8. The collision avoidance system of claim 6, wherein the display comprises a remote user interface device communicable with the communication module over a network.

9. The collision avoidance system of claim 1, wherein the collision avoidance aid comprises an audio device.

10. The collision avoidance system of claim 1, wherein the collision avoidance aid comprises a vehicle adjustment system arranged to adjust the vehicle automatically to avoid a collision between the body of the vehicle and the mapped object.

11. The collision avoidance system of claim 10, wherein the vehicle adjustment system comprises a suspension system arranged to adjust a ride height of the vehicle.

12. The collision avoidance system of claim 10, wherein the vehicle adjustment system comprises a drive or braking system arranged to adjust a velocity of the vehicle.

13. The collision avoidance system of claim 10, wherein the vehicle adjustment system comprises a steering system arranged to control a turning path of the vehicle.

14. A vehicle comprising the collision avoidance system of claim 1.

15. A method of sensing a collision risk comprising:
mapping a three dimensional object located within a surrounding environment of a vehicle;
superimposing a potential position of a body of the vehicle on to the mapped object;
distinguishing between an impact location on the mapped object above a ride height of the body of the vehicle and a clearance location on the mapped object below a ride height of the body of the vehicle based on the potential position of the body of the vehicle on the mapped object; and
communicating the impact location to a collision avoidance aid.

16. The method of claim 15, further comprising:
adjusting a configuration of the vehicle automatically to avoid the body of the vehicle contacting the mapped object to thereby avoid a collision.

17. The method of claim 15, further comprising:
displaying the impact location to a navigator of the vehicle.

* * * * *